US011307287B2

United States Patent
Yeh et al.

(10) Patent No.: US 11,307,287 B2
(45) Date of Patent: Apr. 19, 2022

(54) RADAR APPARATUS AND LEAKAGE CORRECTION METHOD

(71) Applicant: RichWave Technology Corp., Taipei (TW)

(72) Inventors: Chiang-Hua Yeh, Taipei (TW); Hsiang-Feng Chi, Taipei (TW)

(73) Assignee: RichWave Technology Corp., Taipei (TW)

( * ) Notice: Subject to any disclaimer, the term of this patent is extended or adjusted under 35 U.S.C. 154(b) by 278 days.

(21) Appl. No.: 16/663,328

(22) Filed: Oct. 24, 2019

(65) Prior Publication Data

US 2020/0132804 A1 Apr. 30, 2020

(30) Foreign Application Priority Data

Oct. 29, 2018 (TW) .................................. 107138193

(51) Int. Cl.
    *G01S 7/03* (2006.01)
    *G01S 7/35* (2006.01)

(52) U.S. Cl.
    CPC .............. *G01S 7/038* (2013.01); *G01S 7/352* (2013.01); *G01S 7/358* (2021.05)

(58) Field of Classification Search
    None
    See application file for complete search history.

(56) References Cited

U.S. PATENT DOCUMENTS

2012/0112956 A1  5/2012  Trotta et al.

FOREIGN PATENT DOCUMENTS

| CN | 101478287 | 7/2009 |
|---|---|---|
| CN | 101603985 | 12/2009 |
| CN | 106105026 | 11/2016 |
| CN | 106911604 | 6/2017 |
| EP | 2786499 | 10/2014 |
| TW | 201616152 | 5/2016 |
| TW | 201621347 | 6/2016 |
| WO | 2015112286 | 7/2015 |

(Continued)

OTHER PUBLICATIONS

Zhang Yu et al., "Adaptive RF interference canceller in high dynamic range Doppler radar for landmine detection," 2018 IEEE Radar Conference (RadarConf18), Apr. 23, 2018, pp. 833-838.

(Continued)

*Primary Examiner* — Whitney Moore
(74) *Attorney, Agent, or Firm* — JCIPRNET

(57) ABSTRACT

A radar apparatus and a leakage correction method thereof are provided. The radar apparatus includes a transmitter and a receiver. The transmitter includes a sinewave signal generator. The sinewave signal generator generates a sinewave signal. The receiver includes another sinewave signal generator and a correcting circuit. The receiver receives transmitting signals including the sinewave signal from the transmitter. The sinewave signal generator of the receiver generates another sinewave signal according to the amplitude of the transmitting signals or received transmitting signals. The correcting circuit corrects leakage situation on the received transmitting signals according to another sinewave signal. The phasor of sinewave form corresponding to the leakage situation relates to the phasor of another sinewave signal. Accordingly, the performance of receiver may be improved effectively.

19 Claims, 11 Drawing Sheets

(56) References Cited

FOREIGN PATENT DOCUMENTS

WO    2018123204    7/2018

OTHER PUBLICATIONS

"Search Report of Europe Counterpart Application", dated Feb. 21, 2020, p. 1-p. 16.
Wu Huan-Ming et al., "MEMS gyroscope interface circuit on chip based on dual-channel demodulation phase calibration technique", Journal of Chinese Inertial Technology, with English abstract, Dec. 15, 2015, pp. 1-8.
"Office Action of China Counterpart Application", dated Aug. 4, 2021, p. 1-p. 9.

RADAR APPARATUS AND LEAKAGE CORRECTION METHOD

CROSS-REFERENCE TO RELATED APPLICATION

This application claims the priority benefit of Taiwan application serial no. 107138193, filed on Oct. 29, 2018. The entirety of the above-mentioned patent application is hereby incorporated by reference herein and made a part of this specification.

BACKGROUND

Technical Field

The disclosure relates to a radar technique, and more particularly to a radar apparatus and its leakage correction method.

Description of Related Art

Radar technology has been developing for many years. With the rapid development of technology, radar equipment is gradually miniaturized, so that the distances between its internal electronic components may be very close. In actual operation, due to small size of the radar equipment, when the radar equipment receives and transmits signals simultaneously, a finite isolation effect may be involved between the receiving and transmitting ends, and the effect may further affects the receiving efficiency. Among the architectures, a low-intermediate frequency (Low-IF) receiving architecture may be used to solve problems of the zero-intermediate frequency (Zero-IF) architecture such as flicker noises, DC offset, local oscillation leakage, etc. However, the smaller the device is the more susceptible the device is with in-band interferences from an intermediate frequency leakage situation, which may result in a blocking signal that degrades receiver performance. Moreover, the leakage situation may corrupt analog-to-digital converter (ADC) signal, even the digital filter may not solve the leakage situation.

SUMMARY

In the embodiment of the disclosure, a radar apparatus includes a transmitter and a receiver. The transmitter includes a sinewave signal generator. The sinewave signal generator is configured to generate a sinewave signal. The receiver is configured to receive a transmitting signal of the sinewave signal transmitted by the transmitter. The receiver includes another sinewave signal generator and a correcting circuit. The other sinewave signal generator is configured to generate another sinewave signal based on an amplitude of the transmitting signal or an amplitude of the received transmitting signal. A correcting circuit is coupled to the other sinewave signal generator and configured to correct a leakage situation of the received transmitting signal based on the other sinewave signal. A phasor corresponding to the leakage situation in the sinewave form is related to a phasor of the other sinewave signal.

On the other hand, in the embodiment of the disclosure, a leakage correction method is suitable for a radar apparatus. The leakage correction method includes the following steps: generates a sinewave signal, receives a transmitting sinewave signal transmitted by the radar apparatus, generates another sinewave signal based on an amplitude of the transmitting signal or an amplitude of the received transmitting signal, correcting a leakage situation of a received transmitting signal based on the other sinewave signal, and a phasor corresponding to the leakage situation in the sinewave form is related to a phasor of the other sinewave signal.

In order to make the above-described features of the disclosure more comprehensible, the following detailed description of the embodiments will be described in detail below.

BRIEF DESCRIPTION OF THE DRAWINGS

The accompanying drawings are included to provide a further understanding of the disclosure and are incorporated in and constitute a part of this specification. The drawings illustrate exemplary embodiments of the disclosure and, together with the description, explain the principles of the disclosure.

DESCRIPTION OF THE EMBODIMENTS

Embodiments of the disclosure provide a radar apparatus and a leakage correction method thereof, which simulates a leakage situation through a loopback architecture of a receiving end, thereby correcting a leakage situation and improving the performance of receiver.

Figure 1:
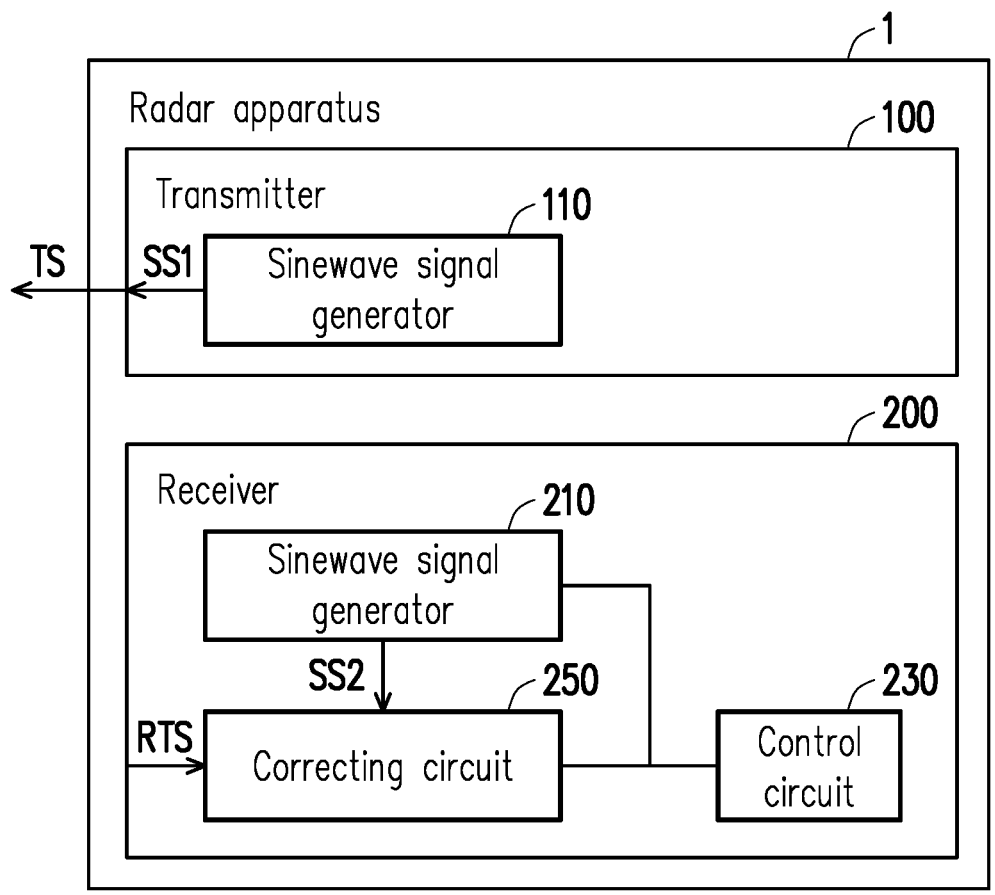
FIG. 1 is a block diagram of components of a radar apparatus according to an embodiment of the disclosure.

FIG. 1 is a block diagram of components of a radar apparatus 1 according to an embodiment of the disclosure. Referring to FIG. 1, the radar apparatus 1 includes at least but not limited to a transmitter 100 and a receiver 200. The radar apparatus 1 may be applied to meteorology, speed measurement, vehicle reversing, terrain detection, military and other fields.

The transmitter 100 includes at least but not limited to a sinewave signal generator 110 configured to generate a sinewave signal SS1. In one embodiment, the sinewave signal SS1 may be wave-mixed/frequency-mixed by another carrier signal in sinewave form to form a double-sideband suppressed carrier (DSB-SC) signal. For example, the sinewave signal SS1, which is $2\sin(\omega_1 t)$ (i.e., the angular frequency is $\omega_1$, and the amplitude is 2), is mixed with the carrier signal, which is $\cos(\omega_2 t)$ (i.e., the angular frequency is $\omega_2$, and the amplitude is 1), to form a DSB-SC signal, which is $\sin(\omega_1+\omega_2)t+\sin(\omega_1-\omega_2)t$. In another embodiment, the sinewave signal SS1 may also carry data, for example, a spreading code. Next, a transmitting signal TS from an antenna of the transmitter 100 carries the sinewave signal SS1 after the mixing.

The receiver 200 is configured to receive the transmitting signal TS transmitted by the transmitter 100 (e.g., transmitted by the antenna of the transmitter 100). The receiver 200 includes at least but not limited to a sinewave signal generator 210, a control circuit 230, and a correcting circuit 250.

The sinewave signal generator 210 is configured to generate a sinewave signal SS2. The description of sinewave signal SS2 may be referred to the above description of sinewave signal SS1, and will not be further described here.

The control circuit 230 may be a chip, a processor, a microcontroller, an application specific integrated circuit (ASIC), or any type of digital circuit. The control circuit 230 is coupled to the sinewave signal generator 210. The control circuit 230 is configured to instruct a phasor (e.g., amplitude, angular frequency) of the sinewave signal SS2 generated by the sinewave signal generator 210, and may process a baseband signal.

The correcting circuit 250 may be a summation circuit, a differential amplifier, a subtractor, a programmable gain amplifier, and the like. The correcting circuit 250 is coupled to the sinewave signal generator 210 and the control circuit 230. The correcting circuit 250 may receive the sinewave signal SS2 to perform signal summation or subtraction process on another signal, and the detailed operation is explained in detail in the following embodiments.

In the embodiment of the disclosure, in order to facilitate the understanding of the operation flow, a signal processing flow for the radar apparatus 1 will be described in detail below. Hereinafter, the method described in the embodiments of the disclosure will be described with reference to various components and modules in the radar apparatus 1. The various processes of the method may be adjusted according to the implementation condition and are not limited thereto.

Figure 2:
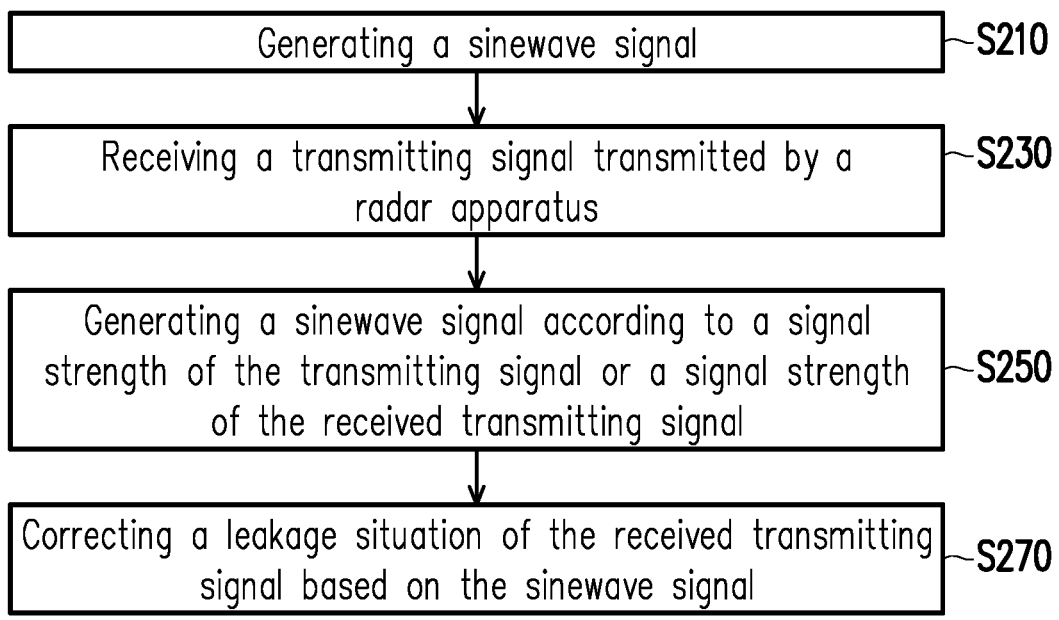
FIG. 2 is a flowchart of a leakage correction method according to an embodiment of the disclosure.

FIG. 2 is a flowchart of a leakage correction method according to an embodiment of the disclosure. Referring to FIG. 2, the sinewave signal generator 110 of the transmitter 100 generates a sinewave signal SS1 (step S210), and the sinewave signal SS1 may be mixed into a radio frequency signal and transmitted through an antenna. Next, the receiver 200 receives the transmitting signal TS transmitted by the transmitter 100 of the radar apparatus 1 through its antenna (step S230), to generate a received transmitting signal RTS. The control circuit 230 determines a signal strength (e.g., but not limited to, amplitude) of the transmitting signal TS or the received transmitting signal RTS and configures the sinewave signal SS2 generated by the sinewave signal generator 210 according to the signal strength, so that the sinewave signal generator 210 may generate the sinewave signal SS2 according to the signal strength of the transmitting signal TS or the signal strength of the received transmitting signal RTS (step S250). It is worth noting that the received transmitting signal RTS is interference by leakage situation between transmitter 100 and receiver 200 (transmitter 100 and receiver 200 are simultaneously transmitted/received), and the transmitting signal TS is generated based on sinewave signal SS1. Therefore, known signal characteristics of sinewave signal SS1 (e.g., amplitude, phase, in-phase/quadrate-phase information, etc.) may be used to estimate the leakage situation on the receiver 200. The control circuit 230 instructs the sinewave signal generator 210 to adjust the outputted sinewave signal SS2, so that the sinewave signal SS2 is approximated or equivalent to the interference signal of the received transmission signal RTS under in-band from the leakage situation. At this point, the phasor corresponding to the leakage situation in the sinewave form is related to the phasor of the sinewave signal SS2. For example, the two phasors are the same, or the difference is less than an allowable threshold value. The correcting circuit 250 may correct the leakage situation of the received transmitting signal RTS based on the sinewave signal SS2 (step S270).

Figure 3A:
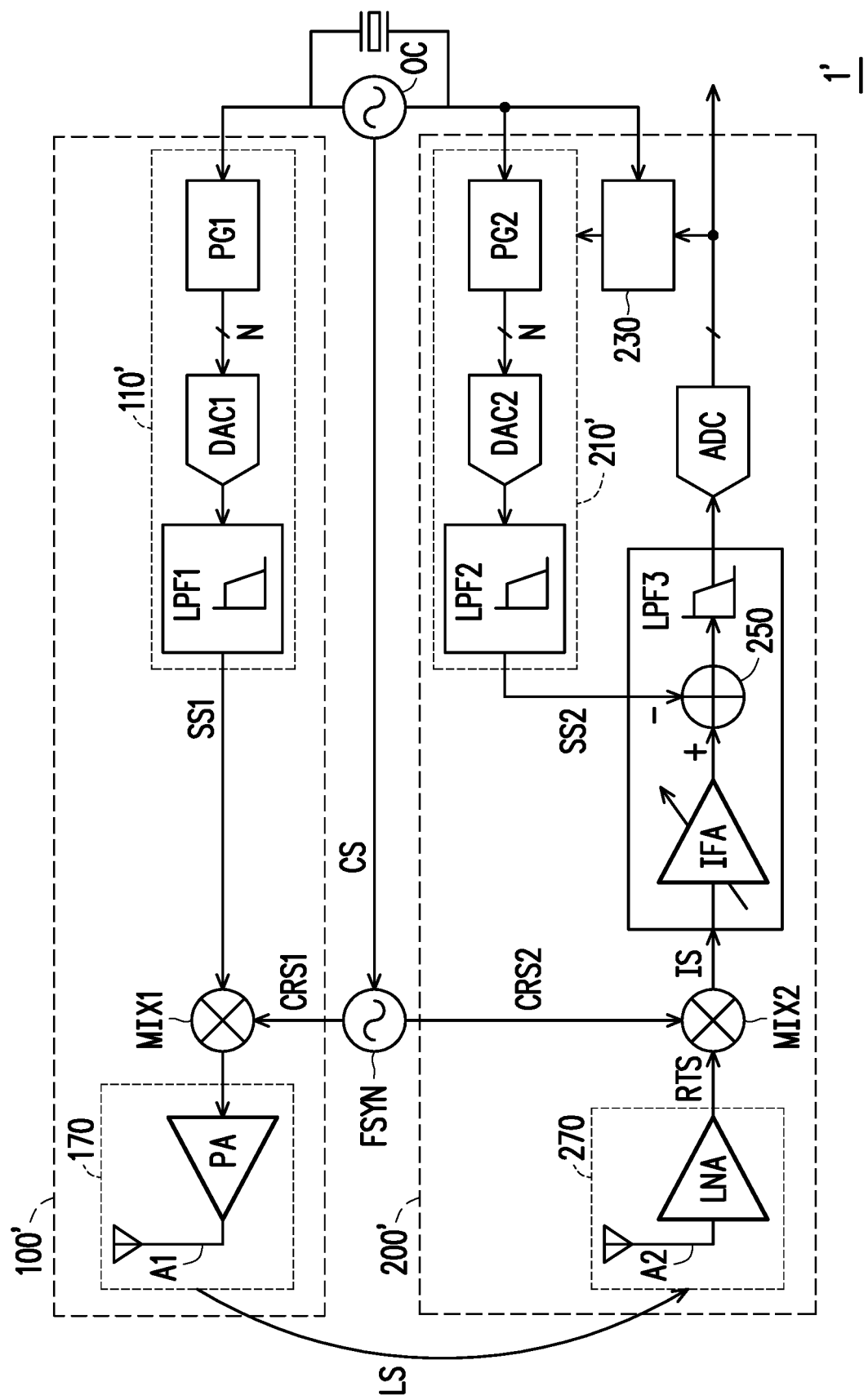
FIG. 3A-FIG. 3C are block diagrams of components of a radar apparatus according to an embodiment of the disclosure.

The following is a more specific hardware architecture, and FIG. 3A is a block diagram of components of a radar apparatus 1' according to an embodiment of the disclosure. Referring to FIG. 3A, the transmitter 100' of the radar apparatus 1' includes a sinewave signal generator 110', a mixer MIX1, and a radio frequency front-end circuit 170.

The sinewave signal generator 110' includes a phasor generator PG1, a digital-to-analog converter DAC1, and a filter LPF1. In this embodiment, the phasor generator PG1 is an N-bit over-sampling modulator (N is a positive integer), and the radar apparatus 1' further includes an oscillator OC (coupled to the sinewave signal generator 110') to provide a clock signal CS to a phasor generator PG1. The phasor generator PG1 oversamples via the clock signal CS to generate a digital signal similar to sinewave and drives the digital-to-analog converter DAC1 to generate an analog sinewave signal SS1. The filter LPF1, which is a low-pass filter, then filters the analog sinewave signal SS1 to form the sinewave signal SS1 of the final output of the sinewave signal generator 110'.

The mixer MIX1 is coupled to the sinewave signal generator 110', and the mixer MIX1 mixes (up converts) the sinewave signal SS1 to form a radio frequency signal, so that the radio frequency signal carries information of the sinewave signal SS1. It is worth noting that, a carrier signal CRS1 used by the mixer MIX1 for mixing is generated by the frequency synthesizer FSYN based on the clock signal CS.

The radio frequency front-end circuit 170 is coupled to the mixer MIX1, and the radio frequency front-end circuit 170 includes a power amplifier PA and an antenna A1. The power amplifier PA amplifies the radio frequency signal and transmits it through the antenna A1 (i.e., the transmitted electromagnetic wave carries the transmitting signal TS of the radar apparatus 1').

On the other hand, the receiver 200' includes a sinewave signal generator 210', a control circuit 230, a correcting circuit 250, a radio frequency front-end circuit 270, a mixer MIX2, an intermediate frequency amplifier IFA, a filter LPF3, and an analog-to-digital converter ADC.

The sinewave signal generator 210' includes a phasor generator PG2, a digital-to-analog converter DAC2 and a filter LPF2. The operation of the phasor generator PG2, the digital-to-analog converter DAC2 and the filter LPF2 may be respectively referred to the foregoing descriptions of the phasor generator PG1, the digital-to-analog converter DAC1 and the filter LPF1, and will not be described herein. The sinewave signal generator 210' generates the sinewave signal SS2.

It should be noted that, the two sinewave signal generators 110' and 210' of this embodiment generate signals based on the clock signal CS, so the two sinewave signals SS1 and SS2 have the same frequency, but their amplitude and/or phase information may be different. It should be noted that, in other embodiments, the phasor generators PG1 and PG2 may perform sample operation with a frequency not greater than (i.e., less than or equal to) half the clock rate of the clock signal CS; alternatively, the phasor generators PG1 and PG2 may be other circuits that generate digital signals similar to sinewave.

The radio frequency front-end circuit 270 includes a low noise amplifier LNA and an antenna A2. The low noise amplifier LNA amplifies the transmitting signal TS received by the antenna A2, to generate a received transmitting signal RTS.

The mixer MIX2 is coupled to the radio frequency front-end circuit 270, and the mixer MIX2 mixes the received transmitting signal RTS (down converted), to form the intermediate frequency signal IS. It should be noted that, a carrier signal CRS2 used by the mixer MIX2 for mixing is also generated by the frequency synthesizer FSYN based on the clock signal CS (e.g., a carrier signal based on the same frequency or a multiple frequency). Therefore, the carrier signal is consistent with the clock rate of the sinewave signals SS1 and SS2 without further correction of the clock rate. However, in other embodiments, considering the clock-correctable design, the clock rate of the foregoing may be independently generated, and the disclosure is not limited.

The intermediate frequency amplifier IFA filters and amplifies the intermediate frequency signal IS in a specific frequency band (assuming that the correcting circuit 250 stops inputting the sinewave signal SS2), then the signal with the desired frequency band is passed through the filter LPF3 and converts into a digital signal (i.e., baseband signal) by an analog-to-digital converter ADC, so that the control circuit 230 may obtain the digital signal.

On the other hand, the correcting circuit 250 of this embodiment is a summation circuit, and may sum the intermediate frequency signal IS and the sinewave signal SS2 in opposite phase (i.e., the sinewave signal SS2 is subtracted from the intermediate frequency signal IS). It should be noted that, the correction circuit 250 of other embodiments may also be disposed in front of the intermediate frequency amplifier IFA (i.e., coupled between the mixer MIX2 and the intermediate frequency amplifier IFA) or behind the filter LPF3 (i.e., coupled between the filter LPF3 and the analog-to-digital converter ADC). The sinewave signal generator 210', the correcting circuit 250, the filter LPF3, the analog-to-digital converter ADC, and the control circuit 230 form a closed loop architecture.

Figure 4:
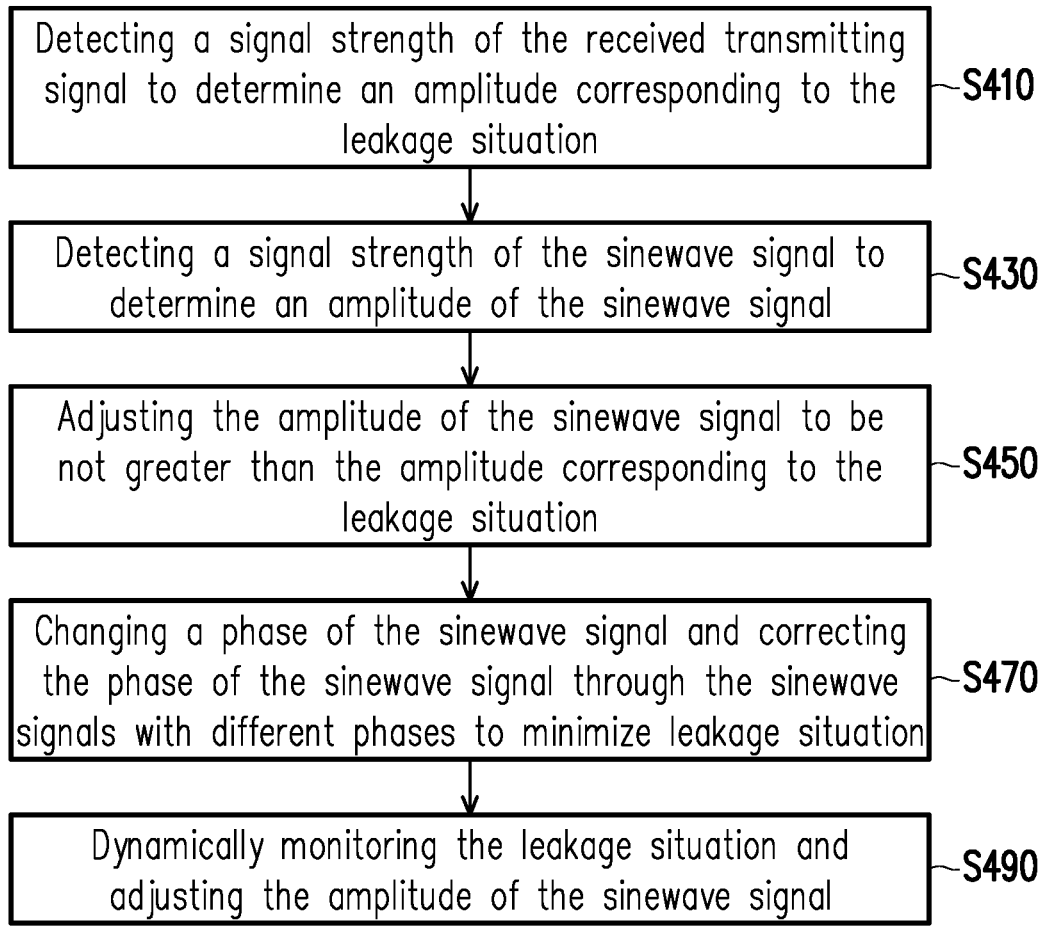
FIG. 4 is a flowchart of a leakage correction method according to an embodiment of the disclosure.

Two leakage situation correction methods for receiver 200' will be described below in conjunction with the various devices and components of FIG. 3A. FIG. 4 is a flowchart of a leakage correction method according to an embodiment of the disclosure. Referring to FIG. 4, the correction method first determines the initial signal strength corresponding to the leakage situation LS between the transmitter 100' and the receiver 200'. The control circuit 230 blocks or suppresses the reception of the sinewave signal SS2 (or a switch is disposed additionally to stop the sinewave signal generator 210' from outputting signal to the correcting circuit 250), so that the control circuit 230 receives a digital signal, which is the received transmitting signal RTS processed by down-conversion, filtering and analog-to-digital conversion. The control circuit 230 then detects the signal strength (e.g., received signal strength indicator (RSSI) and corresponding to its amplitude) of the received transmitting signal RTS accordingly, to determine the amplitude corresponding to the leakage situation (step S410). In another embodiment, since the sinewave signal SS1 carried by the transmitting signal TS has a known amplitude, the control circuit 230 may evaluate, by using the known amplitude, the effects of the leakage situation LS on the amplitude of the received transmitting signal RTS, thus determining the amplitude corresponding to the leakage situation LS under in-band. Therefore, it is not necessary to detect the signal strength of the received transmitting signal RTS.

Next, the control circuit 230 blocks or suppresses the reception of the intermediate frequency signal IS (or a switch is disposed additionally to stop the mixer MIX2 from outputting signal to the correcting circuit 250) and allows the reception of the sinewave signal SS2, so that the control circuit 230 receives a digital signal, which is the sinewave signal SS2 processed by filter and analog-to-digital conversion. The control circuit 230 detects the signal strength (e.g., RSSI, and corresponding to its amplitude) of the received sinewave signal SS2 accordingly, to determine the initial amplitude of the sinewave signal SS2 (step S430). The control circuit 230 then instructs the sinewave signal generator 210' to adjust the amplitude of the sinewave signal SS2 to be not greater than the amplitude corresponding to the leakage situation LS based on the amplitude of the sinewave signal SS1 (step S450), and allows the reception of the intermediate frequency signal IS.

After the amplitude of the sinewave signal SS2 is configured, the sinewave signal generator 210' adjusts the phase of the sinewave signal SS2 according to the phase corresponding to the leakage situation LS. In one embodiment, the sinewave signal generator 210' changes the phase of the sinewave signal SS2 and corrects the received transmitting signal RTS through the correcting circuit 250 through sinewave signal SS2 with different phases. The control circuit 230 sequentially determines the extent to which the leakage situation LS is reduced in the amplitude by the sinewave signal SS2 with different phases. If the leakage situation LS is corrected by the correcting circuit 250 and the corresponding amplitude is less than a threshold value, the sinewave signal generator 210' may determine the phase corresponding to the leakage situation LS as the phase corresponding to the corrected amplitude less than the threshold. For example, after the received transmitting signal RTS is corrected, the phase with the smallest amplitude, the second smallest or the third smallest is determined as the phase corresponding to the leakage situation LS. At this time, the determined phase may make the leakage situation LS be minimized or be reduced to an acceptable level (step S470).

Next, the sinewave signal generator 210' may adjust the phase of the sinewave signal SS2 to be the same as the phase corresponding to the leakage situation LS (i.e., the phase determined in step S470). The radar apparatus 1' may start detecting external objects or object existence or detecting the distance, and correcting the received transmitting signal RTS through the correcting circuit 250 with the aforementioned determined amplitude and phase of the sinewave signal SS2. At the same time, the control circuit 230 dynamically monitors whether the leakage situation LS changes (e.g., the control circuit 230 monitors whether the leakage situation LS changes after every predetermined period of time) and adjusts the amplitude of the sinewave signal SS2 in response to a change in the leakage situation LS (Step S490). For example, if the amplitude corresponding to the leakage situation LS is greater than the threshold, the sinewave signal generator 210' dynamically adjusts the amplitude of the sinewave signal SS2 (e.g., increases a specific amplitude or increases according to the amplitude corresponding to the current leakage situation LS).

It should be noted that, in the foregoing description, the phase of the sinewave signal SS2 is set to be the same as the phase corresponding to the leakage situation LS. However, in other embodiments, the phase of the sinewave signal SS2 may also be set to a phase in which the phase difference between the phases corresponding to the leakage situation LS is less than a specific threshold value.

On the other hand, since the control circuit 230 may obtain the phase/time delay information of the leakage situation LS on the propagation path, the control circuit 230 may use the phase/time delay information as baseline information. In addition, based on the long wavelength of the intermediate frequency signal, the phase difference or time delay can be determined, thereby determining position information of the external moving object.

Figure 5:
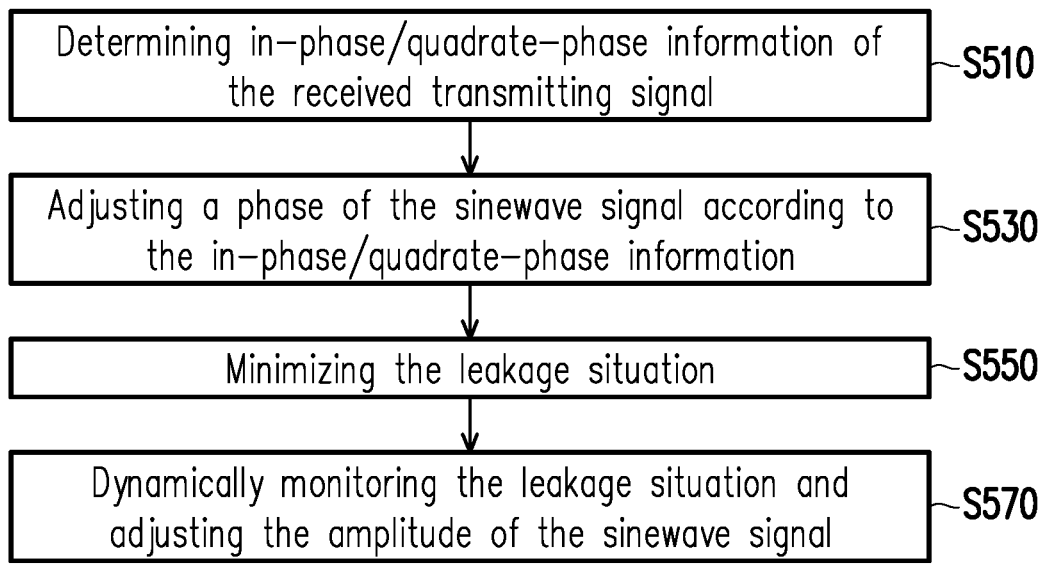
FIG. 5 is a flowchart of a leakage correction method according to another embodiment of the disclosure.

FIG. 5 is a flowchart of a leakage correction method according to another embodiment of the disclosure. Referring to FIG. 5, the correction method first determines in-phase/quadrate-phase information of the leakage situation LS. The control circuit 230 blocks or suppresses the reception of the sinewave signal SS2, so that the control circuit 230 receives a digital signal, which is the received transmitting signal RTS processed by down-conversion, filter, and analog-to-digital conversion. The control circuit 230 then detects the in-phase/quadrate-phase information of the received transmitting signal RTS accordingly, to determine the in-phase/quadrate-phase information of the leakage situation LS (step S510). The corresponding amplitude of the leakage situation LS is related to the summation of the squares of the in-phase and quadrate-phase, and the corresponding phase is related to the arctangent of the result of in-phase divided by quadrate-phase. In another embodiment, since the sinewave signal SS1 carried by the transmitting signal TS has a known amplitude and phase, the control circuit 230 may evaluate the effect on the amplitude and phase of the received transmitting signal RTS by the leakage situation LS using the known amplitude and phase, thus determining the amplitude and phase corresponding to the leakage situation LS under in-band. Therefore, it is not necessary to detect the in-phase/quadrate-phase information of the received transmitting signal RTS.

Next, the control circuit 230 blocks or suppresses the reception of the intermediate frequency signal IS (or a switch is disposed additionally to stop the mixer MIX2 from outputting signal to the correcting circuit 250) and allows the reception of the sinewave signal SS2, so that the control circuit 230 receives the digital signal, which is the sinewave signal SS2 processed by filter and analog-to-digital conversion. The control circuit 230 then detects in-phase/quadrate-phase information of the received sinewave signal SS2, and adjusts the phasor of the sinewave signal SS2 based on the in-phase/quadrate-phase information of the leakage situation LS (step S530). The control circuit 230 instructs the sinewave signal generator 210' based on the in-phase/quadrate-phase information of the leakage situation LS to adjust the amplitude of the sinewave signal SS2 to be not greater than the amplitude corresponding to the leakage situation LS, and adjust the phase of the sinewave signal SS2 to be the same as the phase corresponding to the leakage situation LS (or the difference between the two phases is less than the threshold). Next, the control circuit 230 allows the reception of the intermediate frequency signal IS and corrects the intermediate frequency signal IS by using the sinewave signal SS2 of the determined phasor through the correcting circuit 250' to minimize the leakage situation LS or reduce the leakage situation LS to an acceptable level (step S550). As compared to the embodiment of FIG. 3A, the step of switching the sinewave signal SS2 with different phases to obtain the phase corresponding to the leakage situation LS may be omitted.

Next, when the radar apparatus 1' detects external object or object existence or detects distance, the correcting circuit 250 may correct the received transmitting signal RTS to remove or reduce the interference of the leakage situation LS by using the sinewave signal SS2 of the aforementioned determined phasor. At the same time, the control circuit 230 dynamically monitors the leakage situation LS and adjusts the amplitude of the sinewave signal SS2 (step S570). The detailed operation may be as described above for the description of step S490.

Figure 6A:
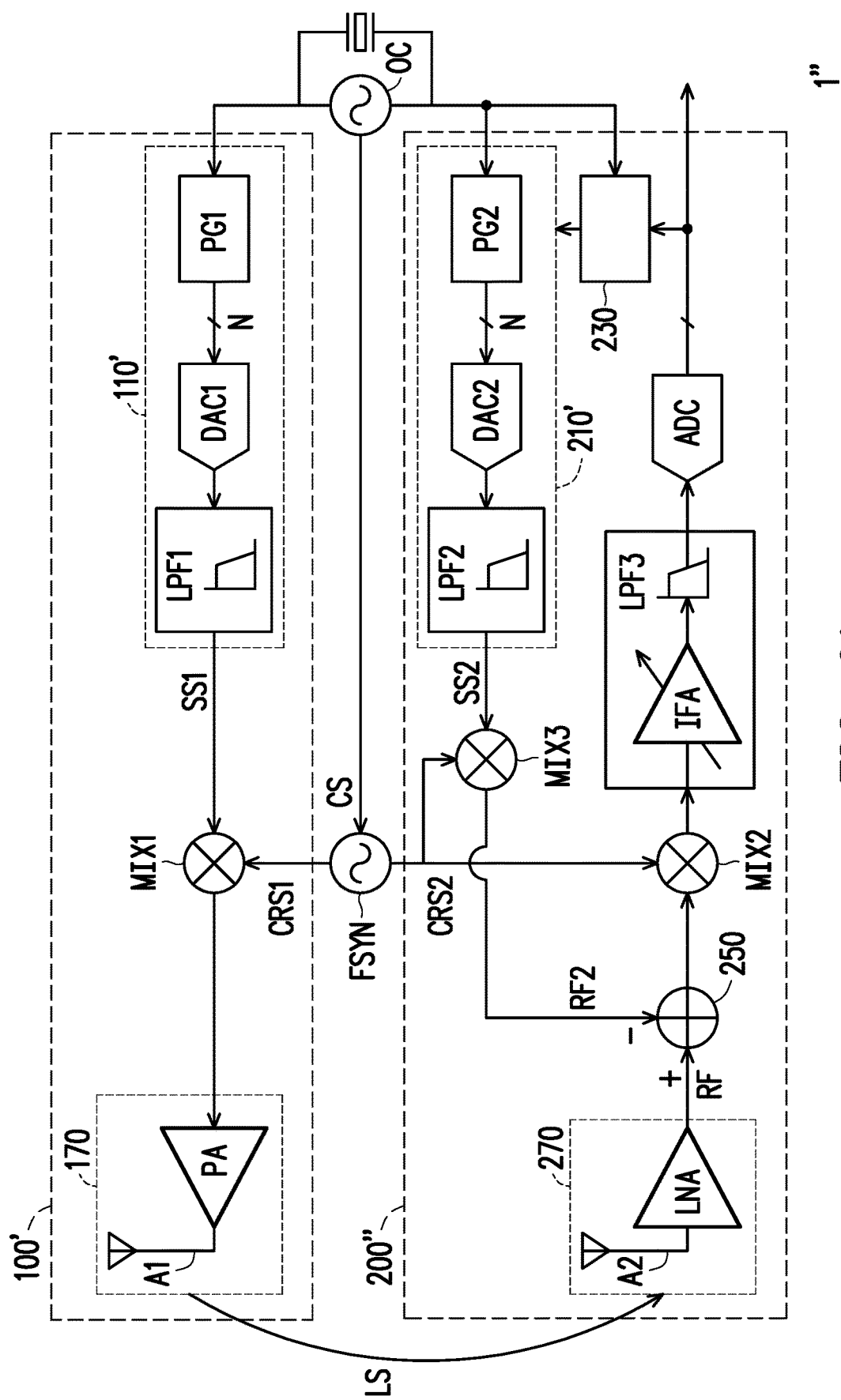
FIG. 6A and FIG. 6B are block diagrams of components of a radar apparatus according to another embodiment of the disclosure.

In the foregoing descriptions of FIG. 3A, FIG. 4, and FIG. 5, signal correction is performed at the intermediate frequency (the intermediate frequency signal IS is processed by the mixer MIX2). However, signal correction of the disclosure may also be performed under the radio frequency. FIG. 6A is a block diagram of components of a radar apparatus 1" according to another embodiment of the disclosure. Referring to FIGS. 3 and 6A, FIG. 6A differs from the radar apparatus 1" of FIG. 3A is that the correcting circuit 250 of the radar apparatus 1" is disposed between the radio frequency front-end circuit 270 and the mixer MIX2, and the receiver 200" further includes a mixer MIX3. The mixer MIX3 is coupled to the filter LPF2, the oscillator OC and the correcting circuit 250 of the sinewave signal generator 210'. The mixer MIX3 may generate the radio frequency signal RF2 according to the sinewave signal SS2 and the carrier signal CRS2. That is, the mixer MIX3 may use the carrier signal CRS2 based on the clock signal CS to mix (up-convert) the sinewave signal SS2.

The leakage situation correction method of the receiver 200" may be referred to FIGS. 4 and 5. The difference from the foregoing descriptions of FIGS. 4 and 5 is that for the receiver 200", in steps S410 and S510, the reception of the radio frequency signal RF2 is blocked or suppressed and reception of the radio frequency signal RF is allowed. Then, in steps S430 and S530, the reception of the radio frequency signal RF is blocked or suppressed and the reception of the radio frequency signal RF2 is allowed. The received transmitting signal RTS of FIG. 3A is the radio frequency signal RF of FIG. 5, and the correcting circuit 250 subtracts the radio frequency signal RF2 from the radio frequency signal RF. In this way, the leakage situation LS may be corrected under the radio frequency.

Figure 3B:
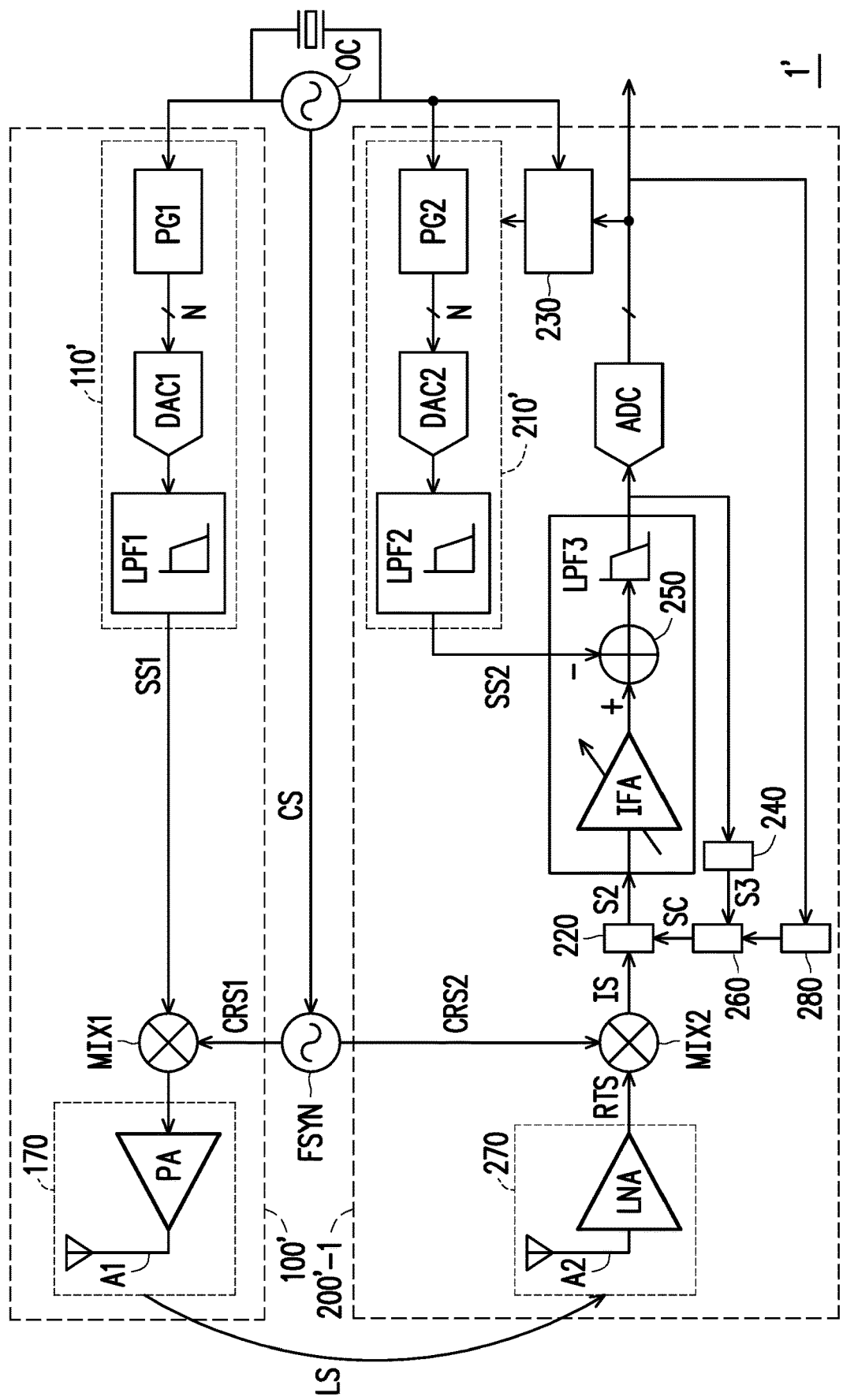

FIG. 3B is a block diagram of components of a radar apparatus 1' according to an embodiment of the disclosure. Referring to FIG. 3B, compared with the receiver 200' illustrated in FIG. 3A, the receiver 200'-1 further includes at least one DC offset circuit 220, a filter 240 and a controller 260. The DC offset circuit 220 is coupled to the mixer MIX2, and the DC offset circuit 220 is coupled to filter 240 and the controller 260.

In an embodiment of the disclosure, the DC offset circuit 220 generates a signal S2 based on the intermediate frequency signal IS. The filter 240 filters out an AC portion related to the signal S2 and generates a signal S3 according to a DC portion of the signal S2. For example, the filter 240 filters out an AC portion of the signal S2, or the filter 240 filters out an AC portion of the signal S2 processed by the intermediate frequency amplifier IFA and the filter LPF. The controller 260 controls the DC offset circuit 220 based on the signal S3 to reduce a DC portion of the intermediate frequency signal IS. In detail, the controller 260 generates a control signal SC based on the signal S3 to control the DC offset circuit 220 to reduce the DC portion of the intermediate frequency signal IS for generating the signal S2. The receiver 200'-1 of the present embodiment adjusts the DC portion of the mixed input signal (i.e., the intermediate frequency signal IS) through the DC offset circuit 220, such that the DC portion of the adjusted mixed input signal (i.e., the signal S2) is reduced. Thus, the receiver 200'-1 is capable of outputting an accurate signal, so as to enhance the performance of the overall system.

In one embodiment, the receiver 200'-1 may optionally include an analog-to-digital converter ADC and a digital signal processor 280. The analog-to-digital converter ADC is coupled between the DC offset circuit 220 and the digital signal processor 280. The analog-to-digital converter ADC receives a signal related to the signal S2 and converts the signal related to the signal S2 into a digital signal. For example, the analog-to-digital converter ADC receives the signal S2 or the signal S2 processed by the intermediate frequency amplifier IFA and the filter LPF3, and converts the signal S2 or the processed signal S2 into a digital signal. The digital signal processor 280 receives the digital signal, generates a correction value Val1 based on the digital signal SD and outputs the correction value Val1 to the controller 260. In the present embodiment, the controller 260 generates the control signal SC based on the signal S3 or the correction value Val1 to control the DC offset circuit 220.

Figure 3C:
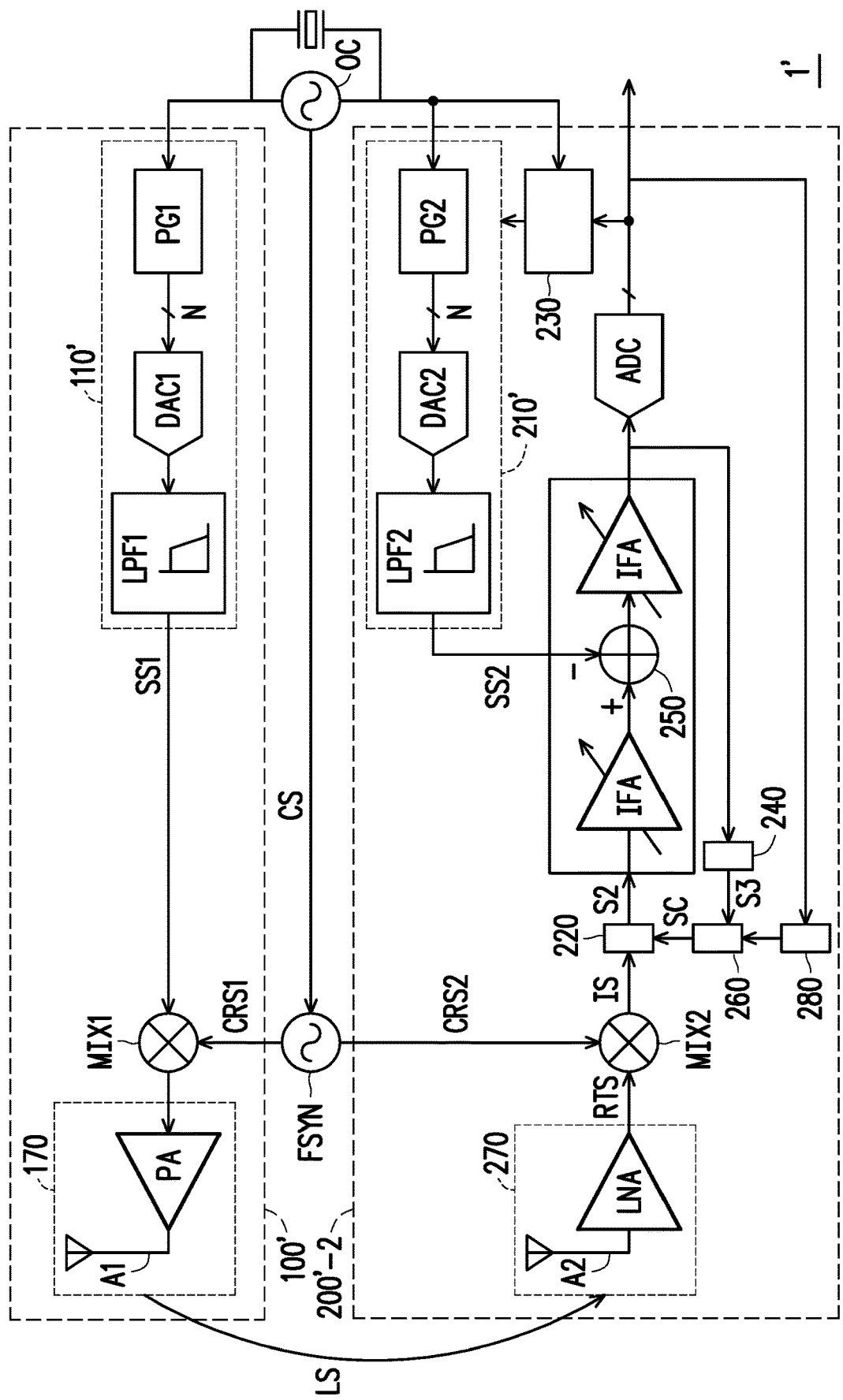

FIG. 3C is a block diagram of components of a radar apparatus 1' according to an embodiment of the disclosure. Referring to FIG. 3C, compared with the receiver 200"-1 illustrated in FIG. 3B, the receiver 200'-2 may optionally include another intermediate frequency amplifier IFA. The intermediate frequency amplifier IFA is coupled between the DC offset circuit 220 and the filter 240. The intermediate frequency amplifier IFA amplifies the signal S2 and outputs an amplified signal to the filter 240. The intermediate frequency amplifier IFA maybe other types of the amplifier which is not limited in the disclosure. In some embodiments, the receiver 200'-2 includes multiple serially connected amplifiers to use these amplifiers having less gain values to achieve an amplification effect same as that by using one amplifier. For example, an amplifier having a gain value of 2 and an amplifier having a gain value of 5 are connected in series to achieve an amplification effect of an amplifier having a gain value of 10.

In some embodiments, the receiver 200'-2 may also optionally include the analog-to-digital converter ADC and the digital signal processor 280. In the present embodiment, the intermediate frequency amplifier IFA is further coupled between the DC offset circuit 220 and the analog-to-digital converter ADC. The analog-to-digital converter ADC receives the amplified signal and converts the amplified signal into the digital signal. Thereafter, the digital signal processor 280 receives the digital signal, generates the correction value Val1 based on the digital signal SD and outputs the correction value Val1 to the controller 260.

Figure 6B:
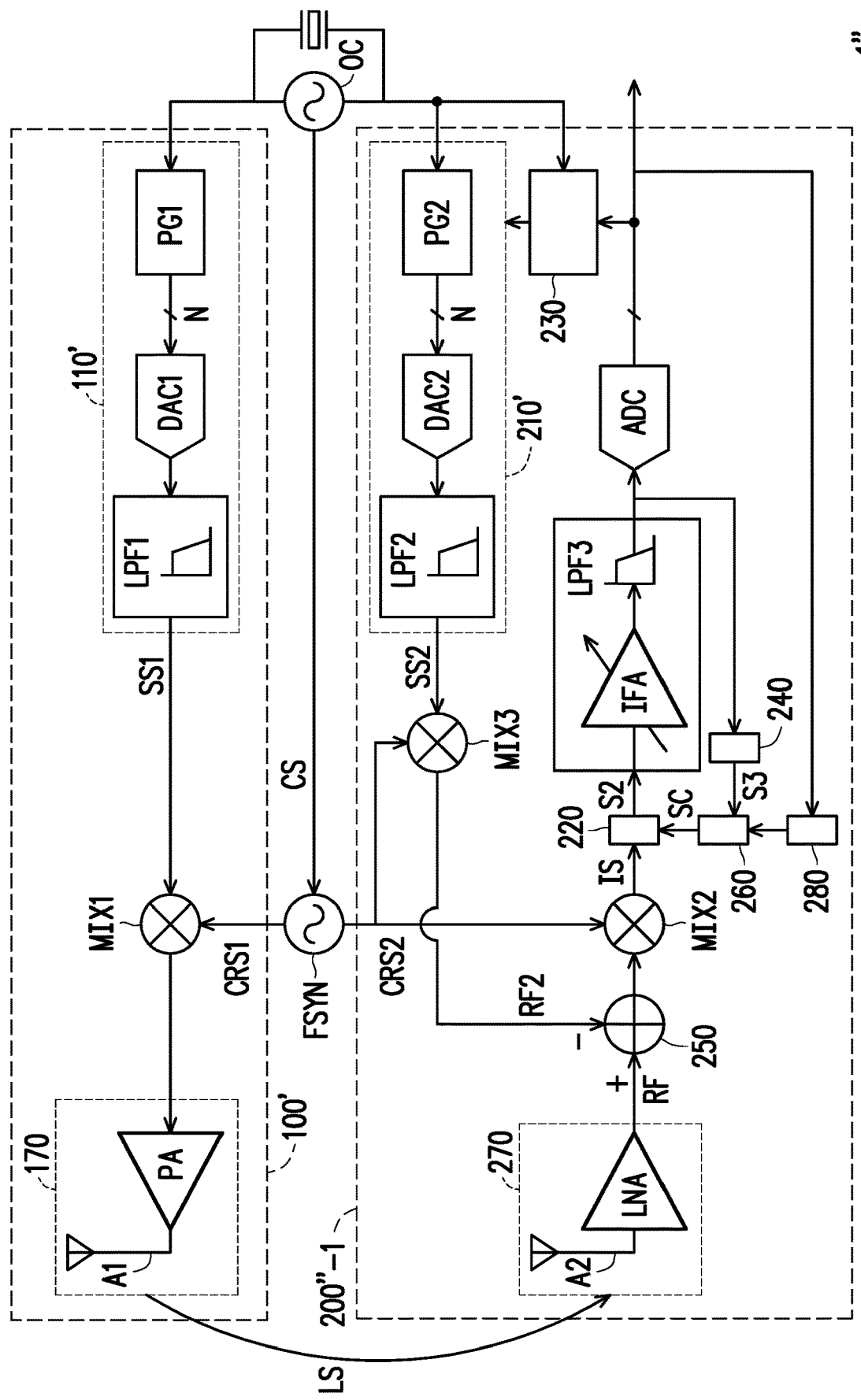

On the other hand, FIG. 6B is a block diagram of components of a radar apparatus 1" according to another embodiment of the disclosure. Referring to FIG. 6B, compared with the receiver 200" illustrated in FIG. 6A, the receiver 200"-1 further includes at least one DC offset circuit 220, a filter 240 and a controller 260. The DC offset circuit 220 is coupled to the mixer MIX2, and the DC offset circuit 220 is coupled to filter 240 and the controller 260. It should be noticed that, the detailed description of the DC offset circuit 220, a filter 240 and a controller 260 illustrated in FIG. 6B can be referred to the DC offset circuit 220, a filter 240 and a controller 260 illustrated in FIG. 3B, and those description would be omitted.

It is to be specifically mentioned herein that a mixer module including the mixer MIX2, the DC offset circuit 220, the filter 240 and the controller 260 may be applied in a single-ended circuit or a double-ended circuit. When being applied in a single-ended circuit, the mixer module is, for example, a single balanced mixer, and when being applied in a double-ended circuit, the mixer module is, for example, a double balanced mixer. The type of the mixer module is not limited in the disclosure. Additionally, in some embodiments, the filter may be, for example, a low pass filter, while the low pass filter may be, for example, a capacitance multiplier filter, and the type of the filter is not limited in the disclosure. In some embodiments, the digital signal processor may be applied in, for example, a digital signal processing (DSP) baseband circuit, which is not limited in the disclosure.

Figure 7:
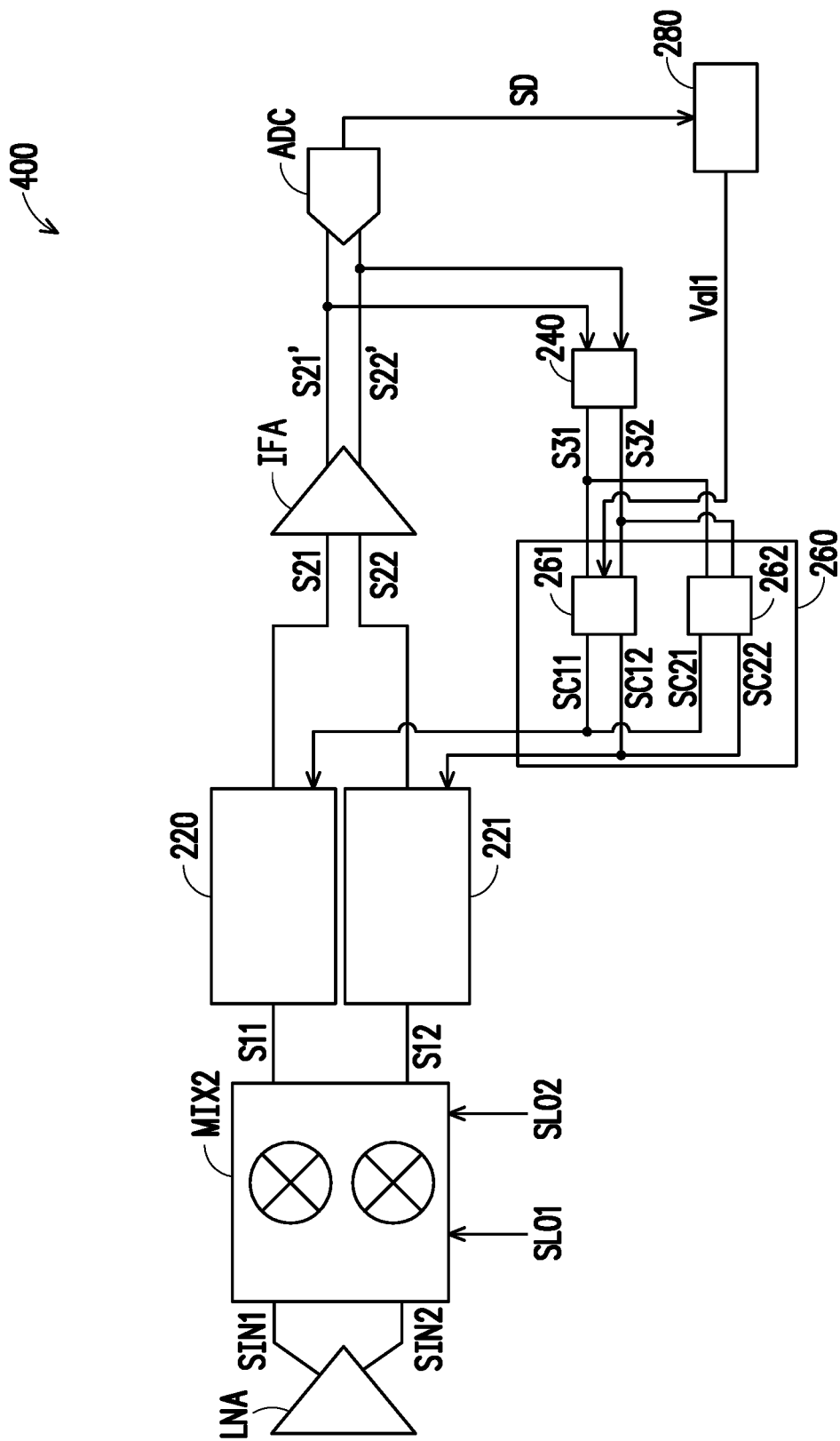
FIG. 7 is a detailed block diagram illustrating a mixer module of a receiver according to an embodiment of the disclosure.

FIG. 7 is a detailed block diagram illustrating a mixer module of the receiver according to an embodiment of the disclosure. FIG. 7 illustrates an example that the mixer module is applied in a double-ended circuit. Referring to FIG. 7, a mixer module 400 further includes a DC offset circuit 221 and a low noise amplifier LNA.

In the present embodiment, the input signal SIN includes a pair of differential signals, which are an input signal SIN1 and an input signal SIN2, respectively. The local oscillation signal SLO based on the clock signal CS includes a pair of differential signals, which are a local oscillation signal SLO1 and a local oscillation signal SLO2, respectively. The intermediate frequency signal IS includes a pair of differential signals, which are a signal S11 and a signal S12, respectively. The signal S2 includes a pair of differential signals, which are a signal S21 and a signal S22. The amplified signal amplified by intermediate frequency amplifier IFA includes a pair of differential signals, which are an amplified signal S21' and an amplified signal S22'. The signal S3 includes a pair of differential signals, which are a signal S31 and a signal S32. The control signal SC includes a pair of differential signals, which are a control signal SC11 and a control signal SC12. However, in some embodiments, the input signal SIN, the local oscillation signal SLO, intermediate frequency signal IS, the signals S2 and S3, the control signal SC may be a single-ended signal, and the disclosure is not limited thereto.

Specifically, the low noise amplifier LNA is coupled to mixer MIX2 and is configured to generate the input signals SIN1 and SIN2. The mixer MIX2 receives the local oscillation signals SLO1 and SLO2 to mix the input signals SIN1 and SIN2 to generate the signals S11 and S12. The DC offset circuits 220 and 221 respectively generate the signals S21 and S22 based on the signals S11 and S12. The intermediate frequency amplifier IFA amplifies the signals S21 and S22 and outputs amplified signals S21' and S22' to the filter 240 and the analog-to-digital converter ADC. The filter 240 filters out AC portions of the amplified signals S21' and S22' to generate the signals S31 and S32 according to DC portions of the amplified signals S21' and S22'. The analog-to-digital converter ADC converts the amplified signals S21' and S22' into the digital signal SD. The digital signal processor 280 receives the digital signal SD to generate the correction value Val1 based on the digital signal SD to output to the controller 260. The controller 260 respectively controls the DC offset circuits 220 and 221 based on the signals S31 to S32 or the correction value Val1 to reduce DC portions of the signals S11 and S12 to generate the signals S21 and S22.

In the present embodiment, the controller 260 in the mixer module 400 includes a control circuit 261 configured to perform a coarse adjustment operation on the DC offset circuits 220 and 221 to reduce the DC portions of the signals S11 and S12. Specifically, the control circuit 261 generates the control signals SC11 and SC12 based on the signals S31 to S32 or the correction value Val1, and then, the DC offset circuits 220 and 221 reduce the DC portions of the signals S11 and S12 based on the control signals SC11 and SC12.

In one embodiment, the controller 260 may optionally include another control circuit 262 which performs the fine adjustment operations on the DC offset circuits 220 and 221. The controller 260 further generates the control signal SC2 based on the signals S31 and S32, and the control signal SC2 includes a pair of differential signals, which are a control signal SC21 and a control signal SC22. The fine adjustment operation is performed by the control circuit 262 based on the signals S31 and S32 to generate the control signals SC21 and SC22, such that the DC offset circuits 220 and 221 further reduce the DC portions of the signals S11 and S12 based on the control signals SC21 and SC22. In the present embodiment, the DC offset circuit 220 is controlled by the combined control signals SC11 and SC21, and the DC offset circuit 221 is controlled by the combined control signals SC12 and SC22, which is not particularly limited in the disclosure. In some embodiments, the control circuit 262 includes a transconductance amplifier, which is not particularly limited in the disclosure.

Figure 8A:
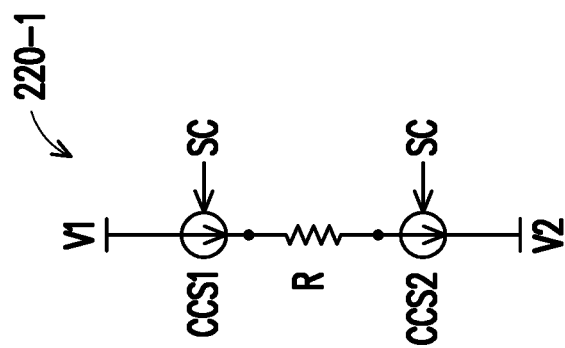
FIG. 8A through FIG. 8C are detailed circuit diagrams respectively illustrating the DC offset circuit in different embodiments.
Figure 8B:
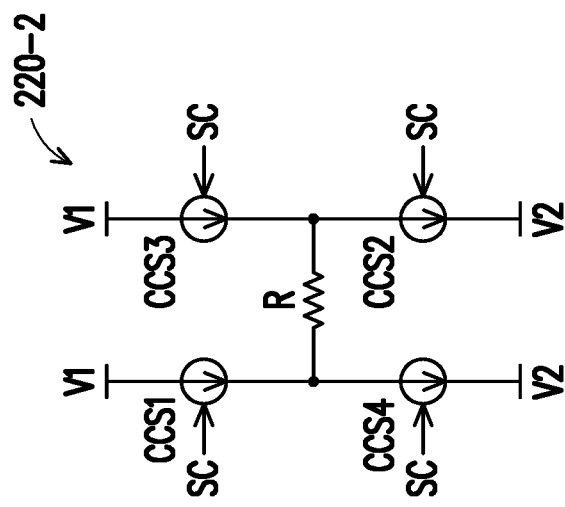
Figure 8C:
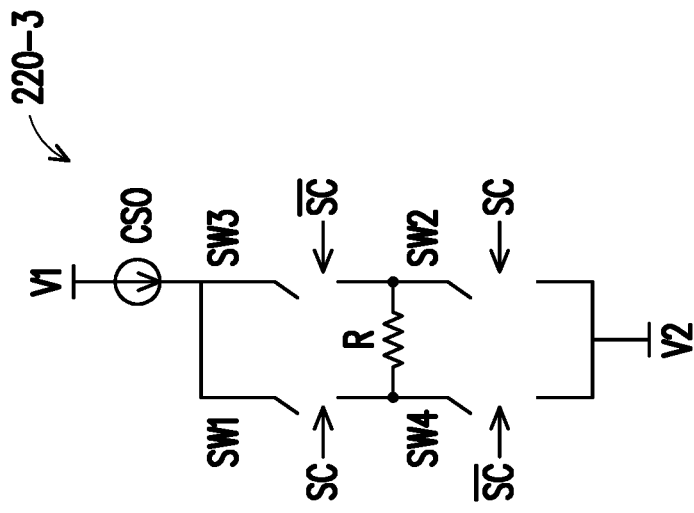

FIG. 8A through FIG. 8C are detailed circuit diagrams respectively illustrating the DC offset circuit 220 and/or the DC offset circuit 221 in different embodiments. It should be specially noted that FIG. 8A through FIG. 8C take the control signal SC generated by the DC offset circuit controlled by controller 260 as an example.

FIG. 8A is a circuit diagram illustrating a DC offset circuit according to an embodiment of the disclosure. Referring to FIG. 8A, in an embodiment of the disclosure, the DC offset circuit 220-1 includes a controllable current source CCS1, a controllable current source CCS2 and a resistor R. A first terminal of the controllable current source CCS1 is coupled to a reference voltage terminal V1, a second terminal of the controllable current source CCS2 is coupled to a reference voltage terminal V2, a first terminal and a second terminal of the resistor R are respectively coupled to a second terminal of the controllable current source CCS1 and a first terminal of the controllable current source CCS2, and one of the first terminal and the second terminal of the resistor R is further coupled to an output terminal of the mixer MIX2 for receiving the intermediate frequency signal IS while the other one of the first terminal and the second terminal of the resistor R is further coupled to the filter 240 or the intermediate frequency amplifier IFA for generating the signal S2. The controllable current sources CCS1 and CCS2 are controlled by the controller 260. In an embodiment of the disclosure, current values of the controllable current sources CCS1 and CCS2 are adjusted to generate a voltage drop between the first terminal and the second terminal of the resistor R, so as to compensate a DC offset in the intermediate frequency signal IS with the voltage drop to reduce the DC portion of the intermediate frequency signal IS.

FIG. 8B is a circuit diagram illustrating a DC offset circuit according to another embodiment of the disclosure. A DC offset circuit 220-2 illustrated in FIG. 8B is different from the DC offset circuit 220-1 illustrated in FIG. 8A is in that the DC offset circuit 220-2 further includes a controllable current source CCS3 and a controllable current source CCS4. A first terminal of the controllable current source CCS3 is coupled to the reference voltage terminal V1, and a second terminal of the controllable current source CCS4 is coupled to the reference voltage terminal V2. The first terminal and the second terminal of the resistor R are respectively coupled to a first terminal of the controllable current source CCS4 and a second terminal of the controllable current source CCS3. The controllable current sources CCS3 and CCS4 are controlled by the controller 260. In an embodiment of the disclosure, current values of the controllable current sources CCS1 to CCS4 are adjusted to generate a voltage drop between the first terminal and the second terminal of the resistor R, so as to compensate the DC offset in the intermediate frequency signal IS with the voltage drop to reduce the DC portion of the intermediate frequency signal IS.

FIG. 8C is a circuit diagram illustrating a DC offset circuit according to another embodiment of the disclosure. Referring to FIG. 8C, in an embodiment of the disclosure, a DC offset circuit 220-3 includes a current source CS, a switch SW1, a switch SW2, a switch SW3, a switch SW4 and the resistor R. A first terminal of the current source CS is coupled to the reference voltage terminal V1, first terminals of the switches SW1 and SW3 are coupled to a second terminal of the current source CS, second terminals of the switches SW2 and SW4 are coupled to the reference voltage terminal V2, the first terminal of the resistor R is coupled to a second terminal of the switch SW1 and a first terminal of the switch SW4, the second terminal of the resistor R is coupled to a second terminal of the switch SW3 and a first terminal of the switch SW2, and one of the first terminal and the second terminal of the resistor R is further coupled to the output terminal of the mixer MIX2 for receiving the intermediate frequency signal IS while the other one of the first terminal and second terminal of resistor R is further coupled to the filter 240 or the intermediate frequency amplifier IFA for generating the signal S2. The switches SW1 through SW4 are controlled by the controller 260. In an embodiment of the disclosure, conduction states of the switches SW1 through SW4 are adjusted to generate the voltage drop between the first terminal and the second terminal of the resistor R, so as to compensate the DC offset in the intermediate frequency signal IS with the voltage drop to reduce DC portion of the intermediate frequency signal IS. In an embodiment of the disclosure, an inverter may be coupled to the output terminal of the controller 260, so that the control signal received by the switches SW1 and SW2 and the control signal received by the switches switch SW3 and SW4 are inverted (for example, referring to the drawing, SC and SC are used to represent that the control signals are inverted to each other). In some embodiments, the DC offset circuit 220-3 may include the current source CS and the resistor R. The first terminal and the second terminal of the current source CS are respectively coupled between the reference voltage terminals V1 and V2. The first terminal and the second terminal of the resistor R are respectively coupled between the second terminal of the current source CS and the reference voltage terminal V2, and one of the first terminal and the second terminal of the resistor R is further coupled to the output terminal of the mixer MIX2 for receiving the intermediate frequency signal IS while the other one of the first terminal and the second terminal of the resistor R is further coupled to the filter 240 or the intermediate frequency amplifier IFA for generating the signal S2. The controller 260 is configured to adjust the voltage drop between the first terminal and the second terminal of the resistor R.

In some embodiments, in each of the DC offset circuits 220-1 to 220-3 described above, the reference voltage terminal V1 is, for example, configured to receive a supply voltage, and the reference voltage terminal V2 is, for example, configured to ground voltage, which is not particularly limited in the disclosure.

In summary, in the radar apparatus and its leakage correction method according to the embodiment of the disclosure, the leakage situation is determined based on the phasor (e.g., amplitude, phase) of the transmitting signal or the received transmitting signal, and a sinewave signal corresponding to the leakage situation is generated accordingly, so that the leakage situation may be corrected. In this way, the leakage situation may be effectively eliminated or improved, thereby improving the performance of receiver. Furthermore, the radar apparatus and its leakage correction method of the embodiment of the disclosure provide a loopback architecture in the receiver. First the phasor of the leakage situation under in-band is estimated, and then the sinewave signal under in-band is simulated according to the phasor corresponding to the leakage situation. This sinewave signal may be used to correct the effect of the leakage situation on the received transmitting signal (more than 30 dB may be improved by experiment). In addition, the clocks rate of the embodiments of the disclosure may be consistent, so that signal correction at the intermediate frequency or the radio frequency could be coherent. At the same time, the phase and time delay of the overall system could be obtained to evaluate the position information of the external objects. On the other hand, the DC portion of the mixed input signal is adjusted through the DC offset circuit, such that the DC portion in the mixed output signal is reduced. Thus, the receiver can output the accurate signal level, so as to enhance the performance of the overall system.

The disclosure has been disclosed in the above embodiments, and is not intended to limit the disclosure. Any one of ordinary skill in the art may make a few changes without departing from the spirit and scope of the invention. The scope of protection of the disclosure is defined by the scope of the appended claims.

What is claimed is:

1. A radar apparatus, comprising:
    a transmitter, comprising:
        a first sinewave signal generator, configured to generate a first sinewave signal; and
        a first mixer, coupled to the first sinewave signal generator and configured to mix the first sinewave signal; and
    a receiver, configured to receive a transmitting signal transmitted by the transmitter, wherein the transmitting signal comprises the first sinewave signal, and the receiver comprises:
        a second mixer, configured to generate an intermediate frequency signal according to a received transmitting signal;
        a second sinewave signal generator, configured to generate a second sinewave signal according to the intermediate frequency signal and according to an amplitude of the transmitting signal or an amplitude of the received transmitting signal; and
        a correcting circuit, coupled to the second sinewave signal generator and the second mixer, and configured to correct a leakage situation of the received transmitting signal based on the second sinewave signal, wherein a phasor corresponding to the leakage situation n a sinewave form is related to a phasor of the second sinewave signal.

2. The radar apparatus according to claim 1, wherein the second sinewave signal generator adjusts an amplitude of the second sinewave signal based on an amplitude of the first sinewave signal to be not greater than an amplitude corresponding to the leakage situation.

3. The radar apparatus according to claim 1, wherein the second sinewave signal generator adjusts a phase of the second sinewave signal according to a phase corresponding to the leakage situation.

4. The radar apparatus according to claim 3, wherein the second sinewave signal generator adjusts the phase of the second sinewave signal to be the same as the phase corresponding to the leakage situation.

5. The radar apparatus according to claim 4, wherein the second sinewave signal generator changes the phase of the second sinewave signal, an amplitude corresponding to the leakage situation is based on a signal strength of the received transmitting signal, the correcting circuit corrects the received transmitting signal through the second sinewave signal with different phases, and the second sinewave signal generator determines the phase corresponding to the leakage situation as a phase corresponding to an amplitude, which is less than a threshold value, after the leakage situation has been corrected by the correcting circuit.

6. The radar apparatus according to claim 3, wherein the receiver comprises:
    a control circuit, coupled to the second sinewave signal generator, and configured to determine in-phase/quadrate-phase information of the received transmitting signal, to determine an amplitude and the phase corresponding to the leakage situation.

7. The radar apparatus according to claim 1, comprising:
    an oscillator, coupled to the first sinewave signal generator and the second sinewave signal generator, and configured to provide a clock signal to the first sinewave signal generator and the second sinewave signal generator, wherein
    the first sinewave signal generator generates the first sinewave signal according to the clock signal, and the second sinewave signal generator generates the second sinewave signal according to the clock signal.

8. The radar apparatus according to claim 1, wherein one of the first sinewave signal generator and the second sinewave signal generator comprises:
    a phasor generator, configured to generate a digital signal;
    a digital-to-analog converter, coupled to the phasor generator, and configured to convert the digital signal into an analog signal; and
    a filter, coupled to the digital-to-analog converter, and configured to filter the analog signal to generate one of the first sinewave signal and the second sinewave signal.

9. The radar apparatus according to claim 8, wherein the phasor generator comprises an over-sampling modulator.

10. The radar apparatus according to claim 8, comprising:
    a radio frequency front-end circuit, configured to receive the transmitting signal to generate the received transmitting signal,
    wherein the second mixer is coupled to the radio frequency front-end circuit and
    an intermediate frequency amplifying circuit, coupled to the second mixer and the correcting circuit, and configured to receive the intermediate frequency signal, wherein the correcting circuit subtracts the second sinewave signal from the intermediate frequency signal processed by the intermediate frequency amplifying circuit.

11. The radar apparatus according to claim 8, wherein the received transmitting signal is a radio frequency signal, and the receiver further comprises:
    a third mixer, coupled to the filter, and configured to generate a second radio frequency signal according to the second sinewave signal and a carrier signal, and the radar apparatus further comprises:

a radio frequency front-end circuit, coupled to the correcting circuit, and configured to receive the transmitting signal to generate the radio frequency signal, wherein the correcting circuit subtracts the second radio frequency signal from the radio frequency signal.

12. The radar apparatus according to claim 1, wherein the second mixer is configured to mix the received transmitting signal to generate the intermediate frequency signal, and the receiver further comprises:
    at least one DC offset circuit, generating a first signal based on the intermediate frequency signal;
    a filter, filtering out an AC portion related to the first signal and generating a second signal according to a DC portion related to the first signal; and
    a controller, controlling the at least one DC offset circuit based on the second signal to reduce a DC portion of the intermediate frequency signal.

13. The radar apparatus according to claim 12, wherein the receiver further comprises:
    an analog-to-digital converter, configured to receive a signal related to the first signal and convert the signal related to the first signal into a digital signal; and
    a digital signal processor, configured to receive the digital signal and configured to generate a first correction value based on the digital signal,
    wherein the controller generates a first control signal based on the second signal or the first correction value to control the at least one DC offset circuit.

14. The radar apparatus according to claim 12, wherein the receiver further comprises:
    at least one amplifier, coupled between the at least one DC offset circuit and the filter, and the at least one amplifier amplifying the first signal to output an amplified first signal;
    an analog-to-digital converter, configured to receive the amplified first signal and convert the amplified first signal into a digital signal; and
    a digital signal processor, configured to receive the digital signal and generate a first correction value based on the digital signal,
    wherein the controller generates a first control signal based on the second signal or the first correction value to control the at least one DC offset circuit.

15. The radar apparatus according to claim 12, wherein the controller comprises:
    a first control circuit, generating a first control signal based on the second signal, wherein the at least one DC offset circuit reduces the DC portion of the intermediate frequency signal based on the first control signal; and
    a second control circuit, generating a second control signal based on the second signal, wherein the at least one DC offset circuit further reduces the DC portion of the first signal based on the second control signal;
    wherein the first control circuit is configured to perform a coarse adjustment operation on the at least one DC offset circuit, and the second control circuit is configured to perform a fine adjustment operation on the at least one DC offset circuit.

16. The radar apparatus according to claim 12, wherein the at least one DC offset circuit comprises:
    a first controllable current source, comprising a first terminal coupled to a first reference voltage terminal;
    a second controllable current source, comprising a second terminal coupled to a second reference voltage terminal; and
    a resistor, comprising a first terminal and a second terminal respectively coupled to a second terminal of the first controllable current source and a first terminal of the second controllable current source, and one of the first terminal and the second terminal of the resistor is further coupled to an output terminal of the second mixer,
    wherein the first controllable current source and the second controllable current source are controlled by the controller.

17. The radar apparatus according to claim 12, wherein the at least one DC offset circuit comprises:
    a current source, comprising a first terminal and a second terminal, respectively coupled between a first reference voltage terminal and a second reference voltage terminal; and
    a resistor, comprising a first terminal and a second terminal, respectively coupled between the second terminal of the current source and the second reference voltage terminal, and one of the first terminal and the second terminal of the resistor is further coupled to an output terminal of the mixer,
    wherein the controller is configured to adjust a voltage drop between the first terminal and the second terminal of the resistor.

18. A radar apparatus, comprising:
    a transmitter, comprising:
        a first sinewave signal generator, configured to generate a first sinewave signal; and
    a receiver, configured to receive a transmitting signal transmitted by the transmitter, wherein the transmitting signal comprises the first sinewave signal, and the receiver comprises:
        a second sinewave signal generator, configured to generate a second sinewave signal according to an amplitude of the transmitting signal or an amplitude of a received transmitting signal; and
        a correcting circuit, coupled to the second sinewave signal generator, and configured to correct a leakage situation of the received transmitting signal based on the second sinewave signal, wherein a phasor corresponding to the leakage situation in a sinewave form is related to a phasor of the second sinewave signal,
    wherein the second sinewave signal generator dynamically adjusts an amplitude of the second sinewave signal in response to an amplitude corresponding to the leakage situation being greater than a threshold.

19. A radar apparatus, comprising:
    a transmitter, comprising:
        a first sinewave signal generator, configured to generate a first sinewave signal; and
    a receiver, configured to receive a transmitting signal transmitted by the transmitter, wherein the transmitting signal comprises the first sinewave signal, and the receiver comprises:
        a second sinewave signal generator, configured to generate a second sinewave signal according to an amplitude of the transmitting signal or an amplitude of a received transmitting signal;
        a correcting circuit, coupled to the second sinewave signal generator, and configured to correct a leakage situation of the received transmitting signal based on the second sinewave signal, wherein a phasor corresponding to the leakage situation in a sinewave form is related to a phasor of the second sinewave signal; and a control circuit, coupled to the second sinewave signal generator, and configured to determine location information of an external object according to a phase corresponding to the leakage situation.

* * * * *